United States Patent
Yamaguchi et al.

(10) Patent No.: US 6,337,135 B1
(45) Date of Patent: Jan. 8, 2002

(54) FLUOROPOLYMER, PROCESS FOR PREPARING THE SAME, AND USE THEREOF

(75) Inventors: Fumihiko Yamaguchi; Yoshitaka Honda, both of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/423,010

(22) PCT Filed: Apr. 28, 1999

(86) PCT No.: PCT/JP98/01948

§ 371 Date: Oct. 29, 1999

§ 102(e) Date: Oct. 29, 1999

(87) PCT Pub. No.: WO98/49218

PCT Pub. Date: Nov. 5, 1998

(30) Foreign Application Priority Data

Apr. 30, 1997 (JP) .............................. 9-112387

(51) Int. Cl.$^7$ .................. B23B 27/06; B23B 27/28; C08G 77/50; C08G 77/60

(52) U.S. Cl. .................. 428/420; 428/421; 428/447; 428/448; 528/10; 528/28; 528/30; 528/42; 427/299; 427/301; 427/302; 427/407.1; 427/419.1; 427/419.8

(58) Field of Search .................. 428/420, 421, 428/447, 448; 528/10, 25, 30, 42; 427/299, 301, 302, 407.1, 419.1, 419.8

(56) References Cited

U.S. PATENT DOCUMENTS

| | | | | |
|---|---|---|---|---|
| 5,238,746 A | * | 8/1993 | Soga et al. .................. | 428/420 |
| 5,262,557 A | * | 11/1993 | Kishita et al. .............. | 556/448 |
| 5,288,890 A | * | 2/1994 | Inomata et al. ............. | 556/440 |
| 5,314,731 A | * | 5/1994 | Yoneda et al. .............. | 428/429 |
| 5,415,927 A | * | 5/1995 | Hirayama et al. ....... | 428/307.3 |
| 5,587,209 A | * | 12/1996 | Soga et al. .................. | 427/503 |

FOREIGN PATENT DOCUMENTS

| | | |
|---|---|---|
| EP | 343526 A2 | 5/1989 |
| EP | 745604 A2 | 5/1996 |
| JP | 62-48724 | 3/1987 |
| JP | A 1-126244 | 5/1989 |
| JP | A 4-132637 | 5/1992 |
| JP | 5-117283 | 5/1993 |
| JP | 5-279499 | 10/1993 |
| JP | 6-256500 | 9/1994 |
| JP | B2 7-53913 | 6/1995 |
| JP | 7-505399 | 6/1995 |
| JP | 9-137027 | 5/1997 |
| WO | WO9707155 | 2/1997 |

* cited by examiner

*Primary Examiner*—Vivian Chen
(74) *Attorney, Agent, or Firm*—Birch, Stewart, Kolasch & Birch, LLP

(57) ABSTRACT

A fluorine-containing polymer, having a number-average molecular weight of 500 to 100,000 and represented by the following general formula $Rf-(OC_3F_6)_a-(OC_2F_4)_b-(OCF_2)_c-X-Y-Z-MP_nR_{m-n}$ or $P_nR_{m-n}M-Z-Y-X-(OC_3F_6)_a-(OC_2F_4)_b-(OCF_2)_c-X-Y-Z-MP_nR_{m-n}$ (wherein Rf is a perfluoroalkyl group; a, b and c independently represent 0 or a number equal to or greater than 1, with the proviso that the sum of a, b and c is at least 1; X is a group represented by the formula: $-(O)_d-(CF_2)_e-(CH_2)_f-$; Y is a divalent polar group; Z is a group represented by the formula: $-(CH_2)_g-$; M is a metal atom; R is a hydrocarbon group; P is a hydrolyzable polar group; m is an integer equal to "(valency of M)–1"; and n is an integer of 1 to m), exhibits excellent stainproof property against oily dirt and can form on a substrate a stainproof layer having an excellent stainproof property against particularly fingerprints.

8 Claims, No Drawings

FLUOROPOLYMER, PROCESS FOR PREPARING THE SAME, AND USE THEREOF

This application is the national phase under 35 U.S.C. § 371 of PCT International Application No. PCT/JP98/01948 which has an International filing date of Apr. 28, 1998, which designated the United States of America.

FIELD OF THE INVENTION

The present invention relates to a fluorine-containing polymer, a process for preparing the polymer, and the use of the polymer, for example, in a stainproof substrate having a stainproof layer of said polymer on a surface thereof.

RELATED ART

Materials such as metals, glass and resins are used as general-purpose substrates for a variety of articles such as automotive parts, OA apparatus and home electric appliances. The surfaces of these substrates are liable to get stained by the adhesion of dust particles suspended in the atmosphere of car interior, office interior, room interior and the like, and by the adhesion of oily substances which are contained in foods, oils for machines and the like and are difficult to be wiped off, and also by the adhesion of fingerprints of users. Therefore, these substrates need to be subjected to a stainproof treatment so that the substrate surface is rendered less adherent to dirt and the dirt once adhered can be easily removed.

As to the stainproof treatment of glass surface, publications such as Japanese Patent Application Laid-Open No. 126244/1989 (JP-A-1-126244) disclose techniques wherein coating films are formed either by direct application of a polymeric substance such as a polydimethylsiloxane to the glass surface or by immersion of glass in a treatment agent containing such a polymeric substance. Also known is a technique wherein a chemical absorption fluorine-containing monomolecular film is formed on the glass surface (see JP-A-4-132637, etc.).

As to the stainproof treatment of metal surface, Japanese Patent Kokoku Publication No. 53913/1995 (JP-B-7-53913) discloses a technique relating to an organic composite-plated steel plate by the steps of forming a chromate coating containing a silica sol silane coupling agent on a galvanized steel and thereafter forming a thin layer with an isocyanate-based paint composition.

However, the above-described treatments of prior arts do not provide a sufficient stainproof against oily dirt. In addition, the prior art treatments are associated with the problem that fingerprints tend to adhere to the substrate surface which is touched with fingers and the removal therefrom of the fingerprints is difficult.

SUMMARY OF THE INVENTION

A first object of the present invention is to provide a fluorine-containing polymer which can form on a substrate a stainproof layer exhibiting an excellent stainproof property against oily dirt, particularly fingerprints, as well as a process for preparing the polymer.

A second object of the present invention is to provide a stainproof substrate which exhibits an excellent stainproof property against oily dirt, particularly against fingerprints, as well as a process for preparing the substrate.

According to the present invention, the first object can be achieved by a fluorine-containing polymer having a number-average molecular weight of 500 to 100,000 and represented by the following general formula (I):

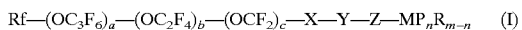

wherein

Rf is a perfluroalkyl group;

a, b and c independently represent 0 or a number equal to or greater than 1, with the proviso that the sum of a, b and c is at least 1;

X is a group represented by the formula: $—(O)_d—(CF_2)_e—(CH_2)_f—$ (where d, e and f independently represent 0 or a number equal to or greater than 1, with the proviso that the sum of e and f is at least 1, and the presence order of the bracketed repeating units is arbitrary in the formula);

Y is a divalent polar group;

Z is a group represented by the formula: $—(CH_2)_g—$ (where g is 0 or a number equal to or greater than 1);

M is a metal atom;

R is a hydrocarbon group;

P is a hydrolyzable polar group;

m is an integer equal to "(valency of M)−1", n is an integer of 1 to m;

with the proviso that the presence order of the bracketed repeating units is arbitrary in the formula; $—OC_3F_6—$ represents either $—OCF_2CF_2CF_2—$ or $—OCF(CF_3)CF_2—$; and $—OC_2F_4—$ represents either $—OCF_2CF_2—$ or $—OCF(CF_3)—$.

A preferred example of the fluorine-containing polymer (I) is a fluorine-containing polymer having a number-average molecular weight of 500 to 100,000 and represented by the following general formula (III):

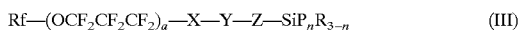

wherein Rf, X, Y, Z, P and R are the same as defined above, and n is an integer of 1 to 3, with the proviso that a is a number equal to or greater than 1.

Likewise, the first object can be achieved by a fluorine-containing polymer having a number-average molecular weight of 500 to 100,000 and represented by the following general formula (II):

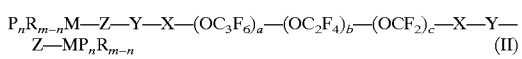

wherein X, Y, Z, M, P, R, a, b, c, m and n are the same as defined above.

In the general formulae (I) and (III), Rf may be any perfluoroalkyl group contained in known fluorine-containing organic polymers, and may be, for example, a linear or branched perfluoroalkyl group having 1 to 16 carbon atoms. Preferably, Rf is $CF_3—$, $C_2F_5—$ or $C_3F_7—$.

In the general formulae (I) and (II), a, b and c represent, respectively, the numbers of the three-type repeating units in the perfluoropolyethers constituting the main skeleton of the fluorine-containing polymer, wherein a, b and c are each 0 or a positive number equal to or greater than 1, with the proviso that a+b+c is at least 1. Preferably, a, b and c are independently selected from 0 and a number in the range of from 1 to 200. More preferably, a, b and c are each 1 to 100 when the number-average molecular weight of the fluorine-containing polymer is taken into consideration.

The presence orders of the repeating units in brackets having subscripts a, b and c are described according to specific presence orders in the general formulae (I) and (II) for the purpose of convenience. However, the linkage orders of these repeating units are arbitrary without being limited by these orders.

In the general formulae (I), (II) and (III), X is a group represented by the formula: $-(O)_d-(CF_2)_e-(CH_2)_f-$. In this formula, d, e and f independently represent 0 or a positive number equal to or greater than 1 (e.g., 1 to 50), with the proviso that e+f is at least 1, and the presence order of the repeating units in brackets having subscripts d, e and f is not limited in the formula. Preferably, d, e and f are each 0, 1 or 2. More preferably, d is 0 or 1, e is 2, and f is 0 or 1.

In the general formulae (I), (II) and (III), Y is a divalent polar group. Examples of the divalent polar group may include —COO—, —OCO—, —CONH—, —NHCO—, —OCH$_2$CH(OH)CH$_2$—, —CH$_2$CH(OH)CH$_2$O— —COS—, —SCO— and —O—. Preferably, Y is —COO—, —CONH—, —OCH$_2$CH(OH)CH$_2$— or —CH$_2$CH(OH)CH$_2$O—.

In the general formulae (I), (II) and (III), Z is a group represented by the formula: $-(CH_2)_g-$. In this formula, g represents 0 or a positive number equal to or greater than 1 (e.g., 1 to 50). Preferably, g is 0, 1, 2 or 3.

In the general formulae (I), (II) and (III), M is a metal atom. Examples of the metal atom may include metallic elements which constitute Groups 1 to 15 (e.g., Si, Al and Ti) of the Periodic Table.

In the general formulae (I) and (II), m is equal to "(valency of M)−1" and 0 or a positive number, while n is an integer of 1 to m. The valency of M is ordinarily 1 to 5, for example, 2 to 5, and particularly 3 to 5.

In the general formula (III), n is an integer of 1 to 3.

For example, in the case where M is silicon (Si), m is 3, and n is 1, 2 or 3. Meanwhile, in some cases, the fluorine-containing polymer is present as a mixture of polymers which are represented by the general formula (I), (II) or (III) and have different values for n. If the fluorine-containing polymer is present as a mixture of polymers as described above, n can be given as an average in the mixture.

In the general formulae (I), (II) and (III), the hydrocarbon group represented by R is preferably a hydrocarbon group containing 1 to 5 carbon atoms. Specific examples of the hydrocarbon group may include alkyl groups such as —CH$_3$, —C$_2$H$_5$ and —C$_3$H$_7$.

Examples of the hydrolyzable polar group represented by P may include halogen, —OA, —OCOA, —O—N=C(A)$_2$ (where A is an alkyl group such as —CH$_3$, —C$_2$H$_5$ and —C$_3$H$_7$).

The number-average molecular weight of the fluorine-containing polymer is ordinarily 500 to 100,000. If the number-average molecular weight is less than 500, the polymer is useless because good properties of a polymer are not exhibited. On the other hand, if the number-average molecular weight is more than 100,000, the processability of the polymer is impaired. Preferably, the number-average molecular weight is 1,000 to 10,000.

The polymer (I) can be prepared by the reaction preferably between a compound represented by the following general formula (IV):

$$Q-Z-M-P_nR_{m-n} \quad (IV)$$

wherein Z, M, P, R, m and n are the same as defined above, and Q is a polar group, and either a compound represented by the following general formula (V):

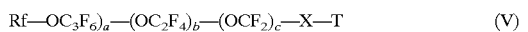
$$Rf-(OC_3F_6)_a-(OC_2F_4)_b-(OCF_2)_c-X-T \quad (V)$$

wherein Rf, X, a, b and c are the same as defined above, and T is a polar group, or a compound represented by the following general formula (VIII):

$$Rf-(OCF_2CF_2CF_2)_a-X-T \quad (VIII)$$

wherein Rf, X and a are the same as defined above, and T is a polar group.

Further, the polymer (II) can be synthesized by the reaction preferably between a compound represented by the following general formula (IV):

$$Q-Z-M-P_nR_{m-n} \quad (IV)$$

wherein Z, M, P, R, m and n are the same as defined above, and Q is a polar group, and a compound represented by the following general formula (VI):

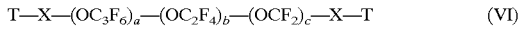
$$T-X-(OC_3F_6)_a-(OC_2F_4)_b-(OCF_2)_c-X-T \quad (VI)$$

wherein X, a, b and c are the same as defined above, and T is a polar group.

Furthermore, the polymer (III) can be prepared by the reaction preferably between a compound represented by the following general formula (VII):

$$Q-Z-SiP_nR_{3-n} \quad (VII)$$

wherein Z, P and R are the same as defined above, n is an integer of 1 to 3, and Q is a polar group, and a compound represented by the following general formula (VIII):

$$Rf-(OCF_2CF_2CF_2)_a-X-T \quad (VIII)$$

wherein Rf, X and a are the same as defined above, and T is a polar group.

Examples of the polar group represented by Q may include —OH, —NH$_2$, —SH,

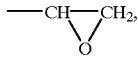

—Hal (halogen) and —COOH.

Examples of the polar group represented by T may include —OH, —COOH, —NH$_2$,

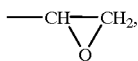

and —CO—Hal (acid halide).

The second object of the present invention can be achieved by a stainproof substrate comprising a substrate, and a layer of the fluorine-containing polymer presented by the general formula (I), (II) or (III) on the substrate.

The polymer layer can be formed by applying a separately prepared polymer (I), (II) or (III) to the substrate surface. On the other hand, in a preferred embodiment, the polymer layer (I), (II) or (III) can be formed by a process comprising forming on the substrate surface a layer of a compound represented by the general formula (IV) and reacting therewith a compound represented by the general formula (V) or (VI) or alternatively by a process comprising forming on the substrate surface a layer of a compound presented by the general formula (VII) and reacting therewith a compound represented by the general formula (VIII).

In the case where a layer of the fluorine-containing polymer is formed by a coating method, a solution, suspension liquid or dispersion liquid of the fluorine-containing polymer is coated on the substrate surface, and then is dried. The coating method may be a conventionally known one and examples of the coating method may include spraying, spin coating, immersion, roll coating, gravure coating and curtain flow coating.

A solvent in which the polymer is dissolved, suspended or dispersed is not particularly limited. Preferred examples of the solvent may include perfluorohexane, perfluoro-1,3-dimethylcyclohexane and dichloropentafluoropropane (HCFC-225).

In the case where a layer of the fluorine-containing polymer is formed by successively applying a compound (IV) and a compound (V) to the substrate surface and reacting the two compounds, and examples of the method for coating the compounds (IV) and (V) may include spraying, spin coating, immersion, roll coating, gravure coating and curtain flow coating.

As to the resin substrates, the substrates are not particularly limited and examples thereof include articles made not only from natural resins but also from synthetic resins.

Examples of the natural resins may include cellulose and japan lacquer. Examples of the synthetic resins may include polyamide resins, polyacrylate resins, polyamideimide resins, polyvinyl acetate resins, polyvinyl chloride resins, phenol resins, urea resins, melamine resins, epoxy resins and polyester resins.

Examples of the metal substrate may include iron, zinc, lead, copper and aluminum.

Meanwhile, the compound (VII) (silane coupling agent and the like), the compound (V) and the compound (VI) are all commercialized and are easily available.

For example, the following compounds are commercially available as the compound (VII) (silane coupling agent and the like) by Toray Dow Coring Co., Ltd.

| Product name | Chemical name | Structural formula | Typical properties | | |
|---|---|---|---|---|---|
| | | | Molecular weight | Specific gravity | Refractive index |
| AX43-062 | γ-mercaptopropylmethyldimethoxysilane | $HSCH_2CH_2CH_2Si(OCH_3)_2$<br>$\mid$<br>$CH_3$ | 180.3 | 0.99 | 1.449 |
| AY43-024 | hydroxypropyltrimethoxysilane | $HOCH_2CH_2CH_2Si(OCH_3)_3$ | 180.3 | 0.90 | 1.365 |
| SH6020<br>SH6020P | γ-(2-aminoethyl)amino-<br>propyltrimethoxysilane | $NH_2CH_2CH_2NHCH_2CH_2CH_2Si(OCH_3)_3$ | 222.1 | 1.03 | 1.444 |
| SZ6023 | γ-(2-aminoethyl)aminopropyl-<br>methyldimethoxysilane | $NH_2CH_2CH_2NHCH_2CH_2CH_2Si(OCH_3)_2$<br>$\mid$<br>$CH_3$ | 206.1 | 0.97 | 1.449 |
| SH6040 | γ-glycidoxypropyltrimethoxysilane | $CH_2\!-\!\!-\!\!CH\!-\!\!-\!CH_2OCH_2CH_2CH_2Si(OCH_3)_3$<br>$\quad\backslash\!\!/$<br>$\quad O$ | 236.1 | 1.07 | 1.427 |
| SH6076 | γ-chloropropyltrimethoxysilane | $ClCH_2CH_2CH_2Si(OCH_3)_3$ | 198.5 | 1.08 | 1.418 |
| SH6062 | γ-mercaptopropyltrimethoxysilane | $HSCH_2CH_2CH_2Si(OCH_3)_3$ | 196.2 | 1.06 | 1.442 |
| AX43-110 | γ-chloropropylmethyldimethoxysilane | $ClCH_2CH_2CH_2Si(OCH_3)_2$<br>$\mid$<br>$CH_3$ | 182.7 | 1.03 | 1.426 |

When applying the compounds (IV) and (V), these compounds are preferably dissolved, suspended or dispersed in a solvent. The solvent is not particularly limited. For example, in the case of the compound (IV), conventionally used organic solvents, such as acetone, methyl isobutyl ketone and ethanol, can be used, while, in the case of the compound (V), useful solvents include perfluorohexane, perfluoro-1,3-dimethylcyclohexane and dichloropentafluoropropane (HCFC-225).

Although the thickness of the fluorine-containing polymer layer in the stainproof substrate of the present invention is not limited, the thickness is preferably 0.001 μm to 0.03 μm.

The types of the substrate to be stainproof in the present invention are not particularly limited. Accordingly, examples of the substrate may include glass, resins, metals, ceramics, wood, porcelain, stone and leather.

As to the glass substrates, the substrates are not particularly limited so long as they are made from glass. Examples of the substrate may include glass for use on the surface of a variety of articles such as show windows, mirrors, water baths, windowpanes, tablewares and glass cases.

On the other hand, the following compounds are commercially available as the compounds (V) and (VI).

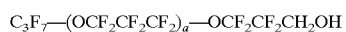

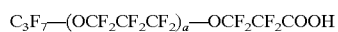

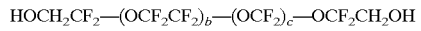

In addition, $C_3F_7\!-\!(OC_3F_6)_a\!-\!OCF_2CF_2COF$ is available as one of raw materials for these compounds (JP-B No. Showa 63-43419 (43419/1988)). A compound such as $C_3F_7\!-\!(OC_3F_6)_a\!-\!OCF_2CF_2CN$ can be derived therefrom (Ind. Eng. Chem. Res., 1987, 26, 1980). Reduction of the foregoing compound provides $C_3F_7\!-\!(OC_3F_6)_a\!-\!OCF_2CF_2CH_2NH_2$.

The reaction between $C_3F_7\!-\!(OC_3F_6)_a\!-\!OC_2F_4CH_2OH$ and epichlorohydrin provides

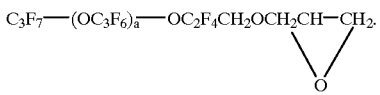

The reaction between $C_3F_7$—$(OC_3F_6)_a$—$OC_2F_4CH_2H$ and a metal hydride $MH_x$ (M is a metal and x is a number of 1 to 6) (e.g., KH and NaH) provides $C_3F_7$—$(OC_3F_6)_a$—$OC_2F_4CH_2OM$ (metal alcoholate).

A fluorine-containing compound (I) or (II) terminated with a metal coupling group can be obtained by chemically combining the perfluoropolyether (V) or (VI) with the compound (VII) through the reaction between the polar groups thereof.

Examples of the reaction between the polar groups are given below.

In the following, for the purpose of simplification,

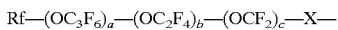

and

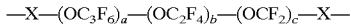

in the general formulae (V) and (VI) are expressed as "PFPE". Likewise, Z—M—$P_nR_{m-n}$ in the general formula (IV) is expressed as "MC".

Accordingly, the general formula (V) is expressed as "PFPE-T", the general formula (VI) as "T-PFPE-T", and the general formula (IV) as "MC-Q". In this case, the general formula (I) is "PFPE-Y-MC" and the general formula (II) is "MC-Y-PFPE-Y-MC".

If an ordinary polar group is selected as T and Q, the fluorine-containing polymers (I) and (II) can be obtained by, for example, the following reactions.

PFPE—COOH+$H_2$N—MC→PFPE—CONH—MC(+$H_2$O)

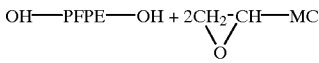

PFPE—COOH+HS—MC→PFPE—COS—MC(+$H_2$O)

KO—PFPE—OK+2Cl—MC→MC—O—PFPE—O—MC(+2KCl)

PFPE—COF+HO—MC→PFPE—COO—MC(+HF)

HOOC—PFPE—COOH+2HO—MC→MC—OCO—PFPE—COO—MC(+2$H_2$O)

Since a metal coupling material is unstable to water, it is preferable that the coating film on the substrate surface is formed by a procedure in which a compound (IV) is first applied to the substrate surface and thereafter the compound (IV) is reacted with a compound (V) or (VI) if water is generated as a by-product.

The substrates whose surface is rendered stainproof according to the present invention can be used as parts of the following articles which are liable to be stained.

Home electric appliances such as blades of electric fans, doors of electronic ovens, and surface of electric refrigerators; office articles such as contact glass of copying machines, mirrors of OHP main bodies, OHP sheets, key boards, telephones and desks; home articles such as glass, doors of cupboards, mirrors, windowpanes, lampshades and chandeliers; architectural members such as show windows, telephone boxes and glass of water baths; automotive parts such as glass and paint films on bodies of vehicles; personal ornaments such as frames of a pair of spectacles, glass of underwater cameras, goggles, helmets and cover glass of dial plates of watches; play goods such as glass of pinball tables, trumps and mahjong tiles; and paint film surfaces of articles such as furniture and piano.

Ornament pieces such as necktie pins, necklaces and pierced earring; metal or plated articles such as faucets of water supply, metal wind instruments, wooden wind instruments, golf clubs, door handles, dumbbells and knifes; stone articles such as gravestones, go game stone pieces and marbles; paper products such as wall paper, paper for sliding partitions, books, posters and photographs; and leather products such as wallets, shoes, bags, wrist watch bands and baseball gloves.

PREFERRED EMBODIMENT OF THE INVENTION

In order to further illustrate the present invention, the following specific examples are given. It should be understood that the following examples do not limit the present invention.

Reference Example 1

A 500 mL four-neck flask equipped with a stirrer, dropping funnel, refluxing condenser and thermometer was charged with a solution prepared by dissolving 180 g (0.5 mol) of $C_3F_7$—$(OCF_2CF_2CF_2)_a$—$OCF_2CF_2COF$ (having a number-average molecular weight of 3,600) in 500 mL of dichloropentafluoropropane (HCFC-225) and the atmosphere of the system was sufficiently replaced with nitrogen. Then, under a nitrogen gas stream, 90 g (0.5 mol) of hydroxypropyltrimethoxysilane (AY-43-024 manufactured by Toray Dow Coring Co., Ltd.) was added dropwise from a dropping funnel to the flask.

Upon completion of the addition, the temperature of the system was raised to 50° C. and the reaction was kept for 4 hours. After the reaction, 250 g of a fluorine-containing polymer [$C_3F_7$—$(OCF_2CF_2CF_2)_a$—$CF_2CF_2COOCH_2CH_2CH_2Si(OCH_3)_3$] was obtained by removing the solvent HCFC-225 under a reduced pressure.

According to the infrared absorption spectrum of the reaction product, the absorption (1890 cm$^{-1}$) due to —COF of the starting material disappeared completely and new absorption (1780 cm$^{-1}$) due to —COO— of ester was found.

The results of the elemental analysis of the fluorine-containing polymer were as follows.

|  | C | F | O | H | Si |
| --- | --- | --- | --- | --- | --- |
| Calculated (%) | 22.7 | 65.2 | 10.9 | 0.4 | 0.8 |
| Found (%) | 21.5 | 65.8 | 11.3 | 0.5 | 0.9 |

Example 1

A 500 mL four-neck flask equipped with a stirrer, dropping funnel, refluxing condenser and thermometer was charged with a solution prepared by dissolving 100 g (0.5 mol) of $C_3F_7$—$(OCF_2CF_2CF_2)_a$—$OCF_2CF_2CF_2CH_2OH$ (having a number-average molecular weight of 2,000) in 500 mL of dichloropentafluoropropane (HCFC-225) and with 1 mL of trifluoroboron ether as a catalyst. The atmosphere of the system was sufficiently replaced with nitrogen. Then, under a nitrogen gas stream, 100 g (0.5 mol) of γ-glycidoxypropyltrimethoxysilane (SH6040 manufactured by Toray Dow Coring Co., Ltd.) was added dropwise from a dropping funnel to the flask.

Upon completion of the addition, the temperature of the system was raised to 50° C. and the reaction was kept for 4 hours. After the reaction, 175 g of a fluorine-containing polymer [$C_3F_7$—($OCF_2CF_2CF_2$)$_a$—$OCF_2CF_2CH_2$—$OCH_2CH(OH)CH_2OCH_2CH_2CH_2Si(OCH_3)_3$] was obtained by removing the solvent HCFC-225 under a reduced pressure.

According to the infrared absorption spectrum of the reaction product, the absorption (795 cm$^{-1}$, 820 cm$^{-1}$) due to epoxy of the starting material disappeared completely.

The results of the elemental analysis of the fluorine-containing polymer were as follows.

|  | C | F | O | H | Si |
|---|---|---|---|---|---|
| Calculated (%) | 24.4 | 61.1 | 12.3 | 1.0 | 1.2 |
| Found (%) | 23.9 | 61.4 | 12.5 | 0.9 | 1.3 |

Reference Example 2

A 500 mL four-neck flask equipped with a stirrer, dropping funnel, refluxing condenser and thermometer was charged with a solution prepared by dissolving 100 g (0.5 mol) of $HOCH_2CF_2$—($OCF_2CF_2$)$_b$—($OCF_2$)$_c$—$OCF_2CH_2OH$ (having a number-average molecular weight of 2,000) in 500 mL of m-xylene hexafluoride and with 1 mL of trifluoroboron ether as a catalyst. The atmosphere of the system was sufficiently replaced with nitrogen. Then, under a nitrogen gas stream, 200 g (1 mol) of γ-glycidoxypropyltrimethoxysilane (SH6040 manufactured by Toray Dow Coring Co., Ltd.) was added dropwise from the dropping funnel to the flask.

Upon completion of the addition, the temperature of the system was raised to 50° C. and the reaction was kept for 4 hours. After the reaction, 250 g of a fluorine-containing polymer [($H_3CO$)$_3SiCH_2CH_2CH_2OCH_2CH(OH)CH_2O$ $CH_2CF_2$—($OCF_2CF_2$)$_b$—($OCF_2$)$_c$—$OCF_2CH_2$—$OCH_2CH(OH)CH_2OCH_2CH_2CH_2Si$ ($OCH_3$)$_3$] was obtained by removing the solvent m-xylene hexafluoride under a reduced pressure.

According to the infrared absorption spectrum of the reaction product, the absorption (795 cm$^{-1}$, 820 cm$^{-1}$) due to epoxy of the starting material disappeared completely.

The results of the elemental analysis of the fluorine-containing polymer were as follows.

|  | C | F | O | H | Si |
|---|---|---|---|---|---|
| Calculated (%) | 26.1 | 51.9 | 17.5 | 1.9 | 2.6 |
| Found (%) | 25.5 | 51.5 | 18.4 | 1.9 | 2.7 |

Reference Example 3, Example 2 and Comparative Example 1

The polymer obtained in Reference Example 1 (Reference Example 3), the polymer obtained in Example 1 (Example 2), and a commercially available, fluorine-containing containing silane coupling agent, $C_8F_{17}CH_2CH_2Si(OCH_3)_3$, KBM7803 manufactured by Shin-Etsu Chemical Co., Ltd. (hereinafter simply referred to as "commercial product") (Comparative Example 1) were dissolved, respectively, in perfluorohexane to prepare 0.1% by weight solutions. These solutions were used as stainproof treatment liquids.

Meanwhile, glass plates for use as substrates were washed with water and thereafter well washed with methanol and acetone. The glass plates thus prepared were immersed in the treatment liquid for 10 seconds, taken out of the liquid, and then dried for 60 minutes at room temperature. Then, the glass plates were subjected to ultrasonic cleaning in perfluorohexane for 5 minutes to remove excessive stainproof treatment components. Then, the glass plates were dried in air and subjected to various measurements.

Reference Example 4

The polymer obtained in Reference Example 2 was dissolved in perfluorohexane to prepare a 0.1% by weight solution. This solution was used as a stainproof treatment liquid.

Meanwhile, a glass plate for use as a substrate was washed with water and thereafter well washed with methanol and acetone. The glass plate thus prepared was immersed in the treatment liquid for 10 seconds, taken out of the treatment liquid, and then dried for 60 minutes at room temperature. Then, the glass plate was subjected to ultrasonic cleaning in perfluorohexane for 5 minutes to remove excessive stainproof treatment components. Then, the glass plate was dried in air and subjected to various measurements.

Reference Example 5

γ-(2—aminoethyl)aminopropyltrimethoxysilane (SH6020 manufactured by Toray Dow Corning Co., Ltd.) (silane coupling agent) was dissolved in acetone to prepare a 0.1% by weight solution.

Meanwhile, a glass plate for use as a substrate was washed with water and thereafter well washed with methanol and acetone. The glass plate thus prepared was immersed in the solution for 1 minute, taken out of the solution, and then dried for 1 hour at room temperature.

Next, $C_3F_7$—($OCF_2CF_2CF_2$)$_n$—$OCF_2CF_2COOH$ (having a number-average molecular weight of 5,000) was dissolved in perfluorohexane to prepare a 0.5% by weight solution. In this solution, the glass plate, which had been treated with the silane coupling agent, was immersed for 1 minute. The glass plate was then taken out of the solution and dried for 1 hour at 100° C.

Then, the glass plate was subjected to ultrasonic cleaning in perfluorohexane for 5 minutes to remove excessive stainproof treatment components. Then, the glass plate was dried in air and subjected to various measurements.

Reference Example 6

γ-mercaptopropyltrimethoxysilane (SH6062 manufactured by Toray Dow Corning Co., Ltd.) (silane coupling agent) was dissolved in acetone to prepare a 0.1% by weight solution.

Meanwhile, a glass plate for use as a substrate was washed with water and thereafter well washed with methanol and acetone. The glass plate thus prepared was immersed in the solution for 1 minute, taken out of the solution, and then dried for 1 hour at room temperature.

Next, $C_3F_7-(OCF_2CF_2CF_2)_a-OCF_2CF_2COOH$ (having a number-average molecular weight of 2,000) was dissolved in perfluorohexane to prepare a 0.5% by weight solution. In this solution, the glass plate, which had been treated with the silane coupling agent, was immersed for 1 minute. The glass plate was then taken out of the solution and dried for 1 hour at 100° C.

Then, the glass plate was subjected to ultrasonic cleaning in perfluorohexane for 5 minutes to remove excessive stainproof treatment components. Then, the glass plate was dried in air and subjected to various measurements.

The properties of the glass plates treated were evaluated according to the following methods.

(1) As to the adhesion of fingerprints, the glass plate samples were stained with fingerprints and the ease of the fingerprints adherence were visually inspected.
  ○: the amount of adhered fingerprint is slight so that the adhered fingerprint is not apparent.
  ×: the amount of fingerprint is the same as that on an untreated glass plate.
  Δ: difficult to give a clear rating between the two described above (2) As to the ease in fingerprint removal, the surfaces of the samples used in the evaluation of the adhesion of fingerprints were wiped by one cycle of reciprocating movement of KIM Wipe (manufactured by Jujo Kimberley Co., Ltd.) and the ease in removal of the fingerprints was visually inspected.
  ○: fingerprints can be completely removed.
  Δ: fingerprint wiping marks remains.
  ×: fingerprints wiping marks extend and removal of the marks is difficult.

(3) Contact angle with water was measured using a contact angle meter (model CA-DT manufactured by Kyowa Kaimem Kagaku Kikai Co., Ltd.).

The results are given below.

|  | Adhesion of fingerprints | Ease in fingerprint removal | Contact angel with water |
|---|---|---|---|
| Reference Example 3 | ○ | ○ | 114° |
| Example 2 | ○ | ○ | 110° |
| Reference Example 4 | ○ | ○ | 109° |
| Reference Example 5 | ○ | ○ | 115° |
| Reference Example 6 | ○ | ○ | 109° |
| Comparative Example 1 | Δ | × | 109° |

Reference Example 7 and Comparative Example 2

The polymer obtained in Reference Example 1 (Reference Example 7) and a commercially available product (Comparative Example 2) were dissolved, respectively, in perfluorohexane to prepare 0.1% by weight solutions.

Meanwhile, aluminum plates for use as substrates (each having a thickness of 0.5 mm and in compliance with JIS H 4000 (A1050P)) were washed with water and thereafter well washed with methanol and acetone.

The aluminum plates thus prepared were immersed in the solutions for 10 seconds, taken out of the solution, and then dried for 60 minutes at room temperature. Then, the aluminum plates were subjected to ultrasonic cleaning in perfluorohexane for 5 minutes to remove excessive stainproof treatment components. Then, the aluminum plates were dried in air and subjected to various measurements.

Comparative Example 3

The aluminum plate in Reference Example 7 was used without being treated.

Reference Example 8

γ-(2-aminoethyl)aminopropyltrimethoxysilane (SH6020 manufactured by Toray Dow Corning Co., Ltd.) (silane coupling agent) was dissolved in acetone to prepare a 0.1% by weight solution.

Meanwhile, an aluminum plate for use as a substrate (having a thickness of 0.5 mm and in compliance with JIS H 4000 (A1050P)) was washed with water and thereafter well washed with methanol and acetone.

The aluminum plate thus prepared was immersed in the solution for 1 minute, taken out of the solution, and then dried for 60 minutes at room temperature.

Next, $C_3F_7-(OCF_2CF_2CF_2)_a-OCF_2CF_2COOH$ (having a number-average molecular weight of 5,000) was dissolved in perfluorohexane to prepare a 0.5% by weight solution. In this solution, the aluminum plate, which had been treated with the silane coupling agent, was immersed for 1 minute. The aluminum plate was then taken out of the solution and dried for 1 hour at 100° C.

Then, the aluminum plate was subjected to ultrasonic cleaning in perfluorohexane for 5 minutes to remove excessive stainproof treatment components. Then, the aluminum plate was dried in air and subjected to the following durability test.

The durability test was conducted in the following manner. The same sample surface was wiped by 100 cycles of reciprocating movement of KIM Wipe (manufactured by Jujo Kimberley Co., Ltd.) under a load of 900 g by using an electric clock meter (416-TM1 model manufactured by Yasuda Seiki Seisakusho Co, Ltd.). The contact angles with water before and after the wiping operations were measured. The contact angle with water was measured using a contact angle meter (model CA-DT manufactured by Kyowa Kaimem Kagaku Kikai Co., Ltd.).

The results are given below.

|  | Contact angle with water before wiping operation | Contact angle with water after wiping operation |
|---|---|---|
| Reference Example 7 | 112° | 107° |
| Reference Example 8 | 115° | 111° |
| Comparative Example 2 | 111° | 98° |
| Comparative Example 3 | 88° | — |

EFFECTS OF THE INVENTION

When used as a stainproof coating layer, the fluorine-containing polymer of the present invention provides a stainproof substrate having an excellent stainproof property against particularly fingerprints. Accordingly, the fluorine-containing polymer of the present invention can be suited for use in a variety of substrates such as glass, resins, metals, ceramics, wood, porcelain, stone and leather.

What is claimed is:

1. A fluorine-containing polymer having a number-average molecular weight of 500 to 100,000 and represented by the following formula (I):

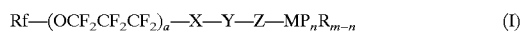

$$Rf-(OCF_2CF_2CF_2)_a-X-Y-Z-MP_nR_{m-n} \qquad (I)$$

wherein
Rf is a perfluoroalkyl group;
a is a number equal to or greater than 1;
X is a group represented by the formula: —(O)$_d$—(CF$_2$)$_e$—(CH$_2$)$_f$— (where d, e and f independently represent 0 or a number equal to or greater than 1, with the proviso that the sum of e and f is at least 1, and the presence order of the bracketed repeating units is arbitrary in the formula);
Y is —OCH$_2$CH(OH)CH$_2$—, —CH$_2$CH(OH)CH$_2$O— or —O—;
Z is a group represented by the formula: —(CH$_2$)$_g$— (where g is 0 or a number equal to or greater than 1);
M is a metal atom;
R is a hydrocarbon group;
P is a hydrolyzable polar group;
m is an integer equal to "(valency of M)-1";
n is an integer of 1 to m.

2. A stainproof substrate comprising a substrate, and a layer which is provided on said substrate and composed of the fluorine-containing of claim 1.

3. A process for preparing the stainproof substrate of claim 2 comprising the steps of forming on a surface of the substrate a layer of a compound represented by the following formula (IV):

  (IV)

wherein
Z is a group represented by the formula: —(CH$_2$)$_g$— (where g is 0 or a number equal to or greater than 1);
M is a metal atom;
R is a hydrocarbon group;
P is a hydrolyzable polar group;
m is an integer equal to "(valency of M)-1";
n is an integer of 1 to m; and
Q is a polar group);
and thereafter reacting said layer with a compound represented by the following formula (V):

  (V)

wherein
Rf is a perfluoroalkyl group;
a is a number equal to or greater than 1;
X is a group represented by the formula: —(O)$_d$—(CF$_2$)$_e$—(CH$_2$)$_f$— (where d, e and f independently represent 0 or a number equal to or greater than 1, with the proviso that the sum of e and f is at least 1, and the presence order of the bracketed repeating units is arbitrary in the formula); and
T is a polar group.

4. A process for preparing the fluorine-containing polymer of claim 1 comprising the steps of carrying out a reaction between a compound represented by the general formula (IV):

  (IV)

wherein
Z is a group represented by the formula: —(CH$_2$)$_g$— (where g is 0 or a number equal to or greater than 1);
M is a metal atom;
R is a hydrocarbon group;
P is a hydrolyzable polar group;
m is an integer equal to "(valency of M)-1";
n is an integer of 1 to m; and
Q is a polar group;
and a compound represented by the following formula (V):

  (V)

wherein
Rf is a perfluoroalkyl group;
a is a number equal to or greater than 1;
X is a group represented by the formula:
—(O)$_d$—(CF$_2$)$_e$—(CH$_2$)$_f$— (where d, e, and f independently represent 0 or a number equal to or greater than 1, with the proviso that the sum of e and f is at least 1, and the presence order of the bracketed repeating units is arbitrary in the formula); and
T is a polar group.

5. A fluorine-containing polymer having a number-average molecular weight of 500 to 100,000 and represented by the following formula (III)

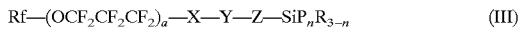  (III)

wherein
Rf is a perfluoroalkyl group;
a is a number equal to or greater than 1;
X is a group represented by the formula: —(O)$_d$—(CF$_2$)$_e$—(CH$_2$)$_f$— (where d, e and f independently represent 0 or a number equal to or greater than 1, with the proviso that the sum of e and f is at least 1, and the presence order of the bracketed repeating units is arbitrary in the formula);
Y is —OCH$_2$CH(OH)CH$_2$—, —CH$_2$CH(OH)CH$_2$O— or —O—;
Z is a group represented by the formula: —(CH$_2$)$_g$— (where g is 0 or a number equal to or greater than 1);
R is a hydrocarbon group;
P is a hydrolyzable polar group; and
n is an integer of 1 to 3.

6. A stainproof substrate comprising a substrate, and a layer which is provided on said substrate and composed of the fluorine-containing of claim 5.

7. A process for preparing the stainproof substrate of claim 6 comprising the steps of forming on a surface of the substrate a layer of a compound represented by the following general formula (VII):

  (VII)

wherein
Z is a group represented by the formula: —(CH$_2$)$_g$— (where g is 0 or a number equal to or greater than 1);
R is a hydrocarbon group;
P is a hydrolyzable polar group;
n is an integer of 1 to 3; and
Q is a polar group;
and thereafter reacting said layer with a compound represented by the following formula (VIII):

  (VIII)

wherein
Rf is a perfluoroalkyl group;
a is a number equal to or greater than 1;

X is a group represented by the formula: $-(O)_d-(CF_2)_e-(CH_2)_f-$ (where d, e and f independently represent 0 or a number equal to or greater than 1, with the proviso that the sum of e and f is at least 1, and the presence order of the bracketed repeating units is arbitrary in the formula); and T is a polar group.

8. A process for preparing the fluorine-containing polymer of claim 5 comprising the steps of carrying out a reaction between a compound represented by the formula (VII):

$$Q-Z-SiP_nR_{3-n} \qquad (VII)$$

wherein

Z is a group represented by the formula: $(CH_2)_g-$ (where g is 0 or a number equal to or greater than 1);

R is a hydrocarbon group;

P is a hydrolyzable group:

n is an integer of 1 to 3;

Q is a polar group;

wherein wherein Rf is a perfluoroalkyl group;

a is a number equal to or greater than 1;

X is a group represented by the formula: $-(O)_d-(CF_2)_e-(CH_2)_f-$ (where d, e, and f independently represent 0 or a number equal to or greater than 1, with the proviso that the sum of e and f is at least 1, and the presence order of the bracketed repeating units is arbitrary in the formula); and T is a polar group.

* * * * *